United States Patent
Hirose et al.

(10) Patent No.: US 6,176,586 B1
(45) Date of Patent: Jan. 23, 2001

(54) PROJECTION DISPLAY APPARATUS

(75) Inventors: Naoki Hirose, Sakai; Kohtaro Hayashi, Toyonaka, both of (JP)

(73) Assignee: Minolta Co., Ltd., Osaka (JP)

( * ) Notice: Under 35 U.S.C. 154(b), the term of this patent shall be extended for 0 days.

(21) Appl. No.: 09/274,910

(22) Filed: Mar. 23, 1999

(30) Foreign Application Priority Data

Mar. 24, 1998 (JP) .................................................. 10-076104
Mar. 25, 1998 (JP) .................................................. 10-077377

(51) Int. Cl.$^7$ .................................................. G03B 21/14
(52) U.S. Cl. .................................... 353/31; 353/20; 349/9
(58) Field of Search .................................. 353/8, 20, 31, 353/33, 34, 37; 349/8, 9

(56) References Cited

U.S. PATENT DOCUMENTS

| 5,365,287 | * | 11/1994 | Vollmer et al. | 353/31 |
| 5,374,968 | * | 12/1994 | Haven et al. | 353/31 |
| 5,577,826 | | 11/1996 | Kasama et al. | 353/31 |
| 5,798,819 | * | 8/1998 | Hattori et al. | 353/33 |
| 5,826,959 | * | 10/1998 | Atsuchi | 353/20 |
| 6,028,703 | * | 2/2000 | Sekine et al. | 359/487 |
| 6,034,818 | * | 3/2000 | Sedmayr | 359/497 |

FOREIGN PATENT DOCUMENTS 2-074903  3/1990  (JP) .
8-122772  5/1996  (JP) .
10-010467  1/1998  (JP) .

* cited by examiner

Primary Examiner—William Dowling
(74) Attorney, Agent, or Firm—Sidley & Austin

(57) ABSTRACT

A projection display apparatus has at least two dichroic reflecting surfaces, a wavelength plate, a polarizing beam splitter, and two reflection-type liquid crystal display devices. The first dichroic reflecting surface separates a polarized light beam into light beams of two different wavelength ranges. The wavelength plate rotates the polarization plane of the light beam of the first wavelength range. The second dichroic reflecting surface integrates together the light beam of the first wavelength range after the rotation of its polarization plane and the light beam of the second wavelength range. The polarizing beam splitter reflects one and transmits the other of the light beams of the first and second wavelength ranges after the integration by the second dichroic reflecting surface. The reflection-type liquid crystal display devices modulate and reflect the light beams reflected from and transmitted through the polarizing beam splitter, respectively. The polarizing beam splitter transmits the light beam coming from the first reflection-type liquid crystal display device and reflects the light beam coming from the second reflection-type liquid crystal display device so as to integrate together those two light beams.

39 Claims, 9 Drawing Sheets

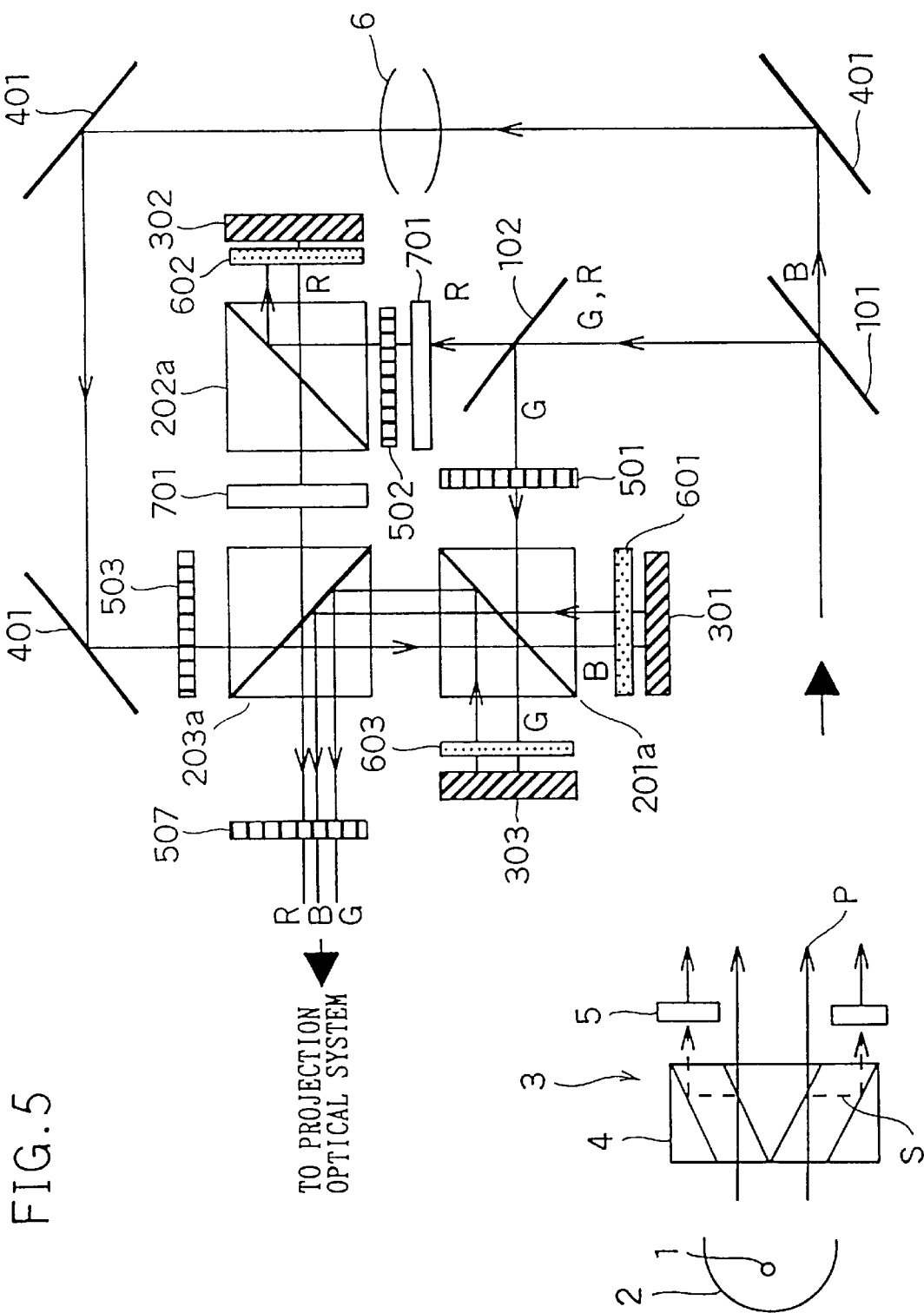

PROJECTION DISPLAY APPARATUS

This application is based on applications Nos. H10-076104 and H10-077377 filed in Japan, the content of which is hereby incorporated by reference.

BACKGROUND OF THE INVENTION

1. Field of the Invention

The present invention relates to a projection display apparatus employing eflection-type liquid crystal display devices.

2. Description of the Prior Art

Conventionally, various display apparatuses of the so-called projection type have been proposed. For example, Japanese Laid-Open Patent Application H2-74903 proposes an arrangement that employs an optical system in which illumination light is separated into beams of different colors and these beams are integrated together by a color integration system including a polarizing beam splitter, a liquid crystal display device, and a cross-dichroic prism. Japanese Laid-Open Patent Application H8-122772 describes, as prior art, an arrangement that employs an optical system composed of three reflection-type liquid crystal display devices, a polarizing beam splitter, and two dichroic mirrors. This Japanese Laid-Open Patent Application H8-122772 proposes an arrangement that employs an optical system composed of three reflection-type liquid crystal display devices and a polarizing beam splitter.

However, the above-mentioned optical system including a cross-dicliroic prism is unduly expensive, because the cross-dichroic prism itself is expensive. The above-mentioned optical system having three reflection-type liquid crystal display devices, a polarizing beam splitter, and two dichroic mirrors requires that the two dichroic mirrors be disposed between the polarizing beam splitter and the reflection-type liquid crystal display devices. This makes the back focal length, i.e. the distance from the projection lens to the reflection-type liquid crystal display devices, unduly long, and thus makes the f-number of the projection lens unduly large, making it impossible to obtain satisfactory brightness.

The above-mentioned optical system proposed in Japanese Laid-Open Patent Application H8-122772 lets unpolarized light enter the polarizing beam splitter, and therefore suffers from flare caused in the projected image by unused polarized-light components. Moreover, this optical system discards the P-polarized light component included in the green component and the S-polarized light component included in the red and blue components without using them for image formation, and thus suffers from inefficient use of the light source.

SUMMARY OF THE INVENTION

An object of the present invention is to provide an inexpensive, compact, and efficient projection display apparatus having a simple structure and offering high contrast and high quality in the projected image.

To achieve the above object, according to one aspect of the present invention, a projection display apparatus is provided with: a first dichroic reflecting surface for separating a polarized light beam into a light beam of a first wavelength range and a light beam of a second wavelength range; a wavelength plate for rotating a polarization plane of the light beam of the first wavelength range; a second dichroic reflecting surface for integrating together the light beam of the first wavelength range after rotation of its polarization plane and the light beam of the second wavelength range; a first polarizing beam splitter for reflecting one and transmitting the other of the light beams of the first and second wavelength ranges after integration by the second dichroic reflecting surface; a first reflection-type liquid crystal display device for modulating and reflecting a light beam reflected from the first polarizing beam splitter; and a second reflection-type liquid crystal display device for modulating and reflecting a light beam transmitted through the first polarizing beam splitter. Here, the first polarizing beam splitter transmits a light beam coming from the first reflection-type liquid crystal display device and reflects a light beam coming from the second reflection-type liquid crystal display device so as to integrate together those two light beams.

According to another aspect of the present invention, an illumination optical system is provided with: separating means for separating a light beam from a light source into a light beam of a first wavelength range and a light beam of a second wavelength range; processing means for optically processing the light beam of the first or second wavelength range; and separating/integrating means for separating a light beam of a third wavelength range from the light beam of the second wavelength range and integrating together a portion of the light beam of the second wavelength range that remains after separation of the light beam of the third wavelength range and the light beam of the first wavelength range.

According to still another aspect of the present invention, a projection display apparatus is provided with: a first dichroic reflecting surface for separating a source light beam into a light beam of a first wavelength range and a light beam of a second wavelength range; a dichroic polarizing beam splitter that transmits the light beams of the first and second wavelength ranges shone onto it from different directions from each other; a first reflection-type liquid crystal display device for modulating and reflecting one of the light beams of the first and second wavelength ranges transmitted through the dichroic polarizing beam splitter; and a second reflection-type liquid crystal display device for modulating and reflecting the other of the light beams of the first and second wavelength ranges transmitted through the dichroic polarizing beam splitter. Here, the dichroic polarizing beam splitter transmits a light beam coming from the first reflection-type liquid crystal display device and reflects a light beam coming from the second reflection-type liquid crystal display device so as to integrate together those two light beams.

Alternatively, a projection display apparatus is provided with: a first dichroic reflecting surface for separating a source light beam into a light beam of a first wavelength range and a light beam of a second wavelength range; a dichroic polarizing beam splitter that reflects the light beams of the first and second wavelength ranges shone onto it from different directions from each other; a first reflection-type liquid crystal display device for modulating and reflecting one of the light beams of the first and second wavelength ranges reflected from the dichroic polarizing beam splitter; and a second reflection-type liquid crystal display device for modulating and reflecting the other of the light beams of the first and second wavelength ranges reflected from the dichroic polarizing beam splitter. Here, the dichroic polarizing beam splitter reflects a light beam coming from the first reflection-type liquid crystal display device and transmits a light beam coming from the second reflection-type liquid crystal display device so as to integrate together those two light beams.

BRIEF DESCRIPTION OF THE DRAWINGS

This and other objects and features of the present invention will become clear from the following description, taken in conjunction with the preferred embodiments with reference to the accompanied drawings in which:

FIG. 5 is a diagram schematically showing a fourth embodiment of the invention;

DESCRIPTION OF THE PREFERRED EMBODIMENTS

Figure 1:
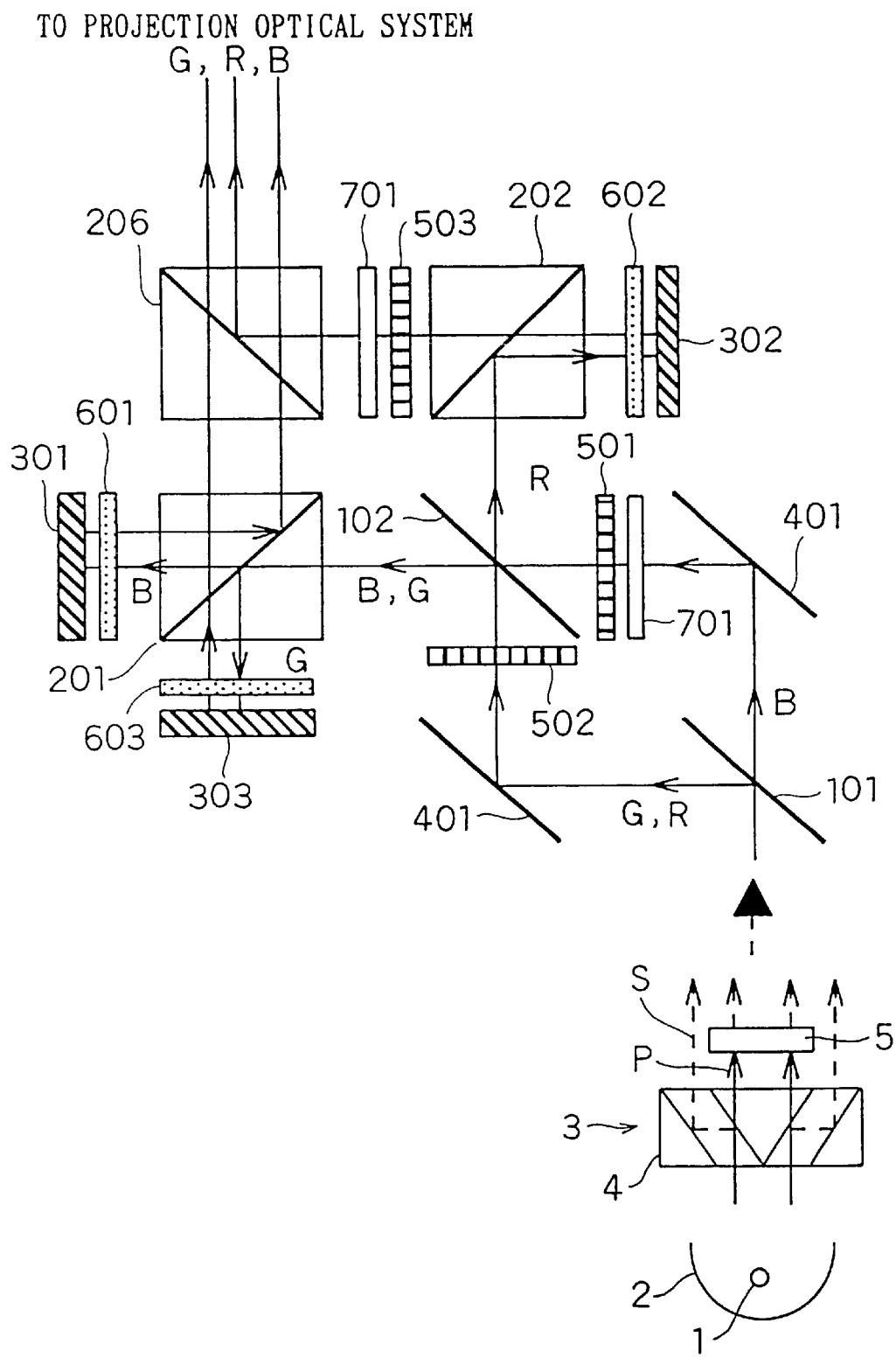
FIG. 1 is a diagram schematically showing a first embodiment of the invention.

Hereinafter, embodiments of the present invention will be described with reference to the drawings. FIG. 1 is a diagram schematically showing a first embodiment of the invention. In FIG. 1, reference numeral 1 represents a white light source; reference numeral 2 represents a reflector, disposed so as to surround the white light source 1, for reflecting the light emitted from the white light source 1; and reference numeral 3 represents a polarization converter, disposed above the white light source 1, for converting the light from the white light source 1 into light polarized on a predetermined polarization plane. In this embodiment, it is assumed that the light from the light source is used after being converted into S-polarized light with respect to the mirrors, prisms, and other optical elements used.

This polarization converter 3 is composed of a polarizing beam splitter 4 for internally reflecting the S-polarized light component, indicated by the broken-line arrow S, and transmitting the P-polarized light component, indicated by the solid-line arrow P, in such a way that they both pass therethrough, and a half-wave plate 5 for rotating the polarization plane of the transmitted P-polarized light component so as to convert it into S-polarized light. The components noted thus far constitute an illumination optical system. Although not shown, it is customary to additionally use an integrator optical system to minimize unevenness of the illumination light of this illumination optical system.

Moreover, in FIG. 1, reference numerals 101 and 102 represent dichroic mirrors; reference numerals 201 and 202 represent polarizing beam splitters; reference numeral 206 represents a dichroic prism; reference numerals 301 to 303 represent reflection-type liquid crystal display devices (slantly hatched rectangles); reference numeral 401 represents reflecting mirrors; reference numerals 501 to 503 represent polarizing plates (horizontally or vertically hatched rectangles); reference numerals 601 to 603 represent band-pass filters (dot-filled rectangles); and reference numeral 701 represents half-wave plates (plain rectangles).

As shown in FIG. 1, the illumination light (a white light beam), composed of the light coming directly from the white light source 1 and the light reflected from the reflector 2, first passes through the polarization converter 3, which transmits the S-polarized light component and converts the P-polarized light component into S-polarized light, and then reaches the dichroic mirror 101. Here, out of the now wholly S-polarized white light beam, only the blue (B) component is transmitted, and the other, green (G) and red (R), components are reflected. The B component transmitted through the dichroic mirror 101 is then reflected from one of the reflecting mirrors 401, has its polarization plane rotated by the half-wave plate 701 so as to be converted into P-polarized light, has its polarization direction aligned by the polarizing plate 501, and then reaches the dichroic mirror 102.

On the other hand, in a similar manner, the G and R components reflected from the dichroic mirror 101 are then reflected from the other of the reflecting mirrors 401, have their polarization direction aligned by the polarizing plate 502, and then reach the dichroic mirror 102. Here, the P-polarized B component is transmitted and the S-polarized G component is reflected so that these two components are integrated together. The S-polarized R component is transmitted and thereby separated from the other components.

This S-polarized R component is then reflected from the polarizing beam splitter 202, has its wavelength range trimmed by the band-pass filter 602, and then illuminates the pixels on the reflection-type liquid crystal display device 302. Here, at every moment, those pixels which are used for screen display are turned on so that the S-polarized R component incident on those pixels is reflected after being converted into P-polarized light, and those pixels which are not used are turned off so that the same component incident on those pixels is reflected intact as S-polarized light. The R component reflected from the reflection-type liquid crystal display device 302 reaches the polarizing beam splitter 202 again. Here, only the P-polarized light component of the R component is transmitted. The transmitted component then has its polarization direction aligned by the polarizing plate 503, has its polarizing plane rotated by the half-wave plate 701 so as to be converted into S-polarized light, and is then reflected from the dichroic prism 206.

On the other hand, the P-polarized B component and the S-polarized G component integrated together by the dichroic mirror 102 reach the polarizing beam splitter 201. Here, the P-polarized B component is transmitted, and the S-polarized G component is reflected. These components then have their wavelength ranges trimmed by the band-pass filters 601 and 603, respectively, and then illuminate the pixels on the reflection-type liquid crystal display devices 301 and 303, respectively. On the reflection-type liquid crystal display device 301, at every moment, those pixels which are used for screen display are turned on so that the P-polarized B component incident on those pixels is reflected after being converted into S-polarized light, and those pixels which are not used are turned off so that the same component incident on those pixels is reflected intact as P-polarized light. The B component reflected from the reflection-type liquid crystal display device 301 reaches the polarizing beam splitter 201 again.

On the reflection-type liquid crystal display device 303, at every moment, those pixels which are used for screen display are turned on so that the S-polarized G component incident on those pixels is reflected after being converted into P-polarized light, and those pixels which are not used are turned off so that the same component incident on those pixels is reflected intact as S-polarized light. The G component reflected from the reflection-type liquid crystal display device 303 reaches the polarizing beam splitter 201 again. Here, the S-polarized B component is reflected and the P-polarized G component is transmitted so that these two components are integrated together.

These S-polarized B component and P-polarized G component integrated together reach the dichroic prism 206, through which they both are transmitted so as to be integrated together with the previously mentioned S-polarized R component. In this way, the components of three primary colors are integrated together, which are then directed to a projection optical system (not shown). Note that, instead of the dichroic prism 206 for reflecting the R component and transmitting the G and B components, it is possible to use a dichroic mirror for the same purposes.

Figure 2:
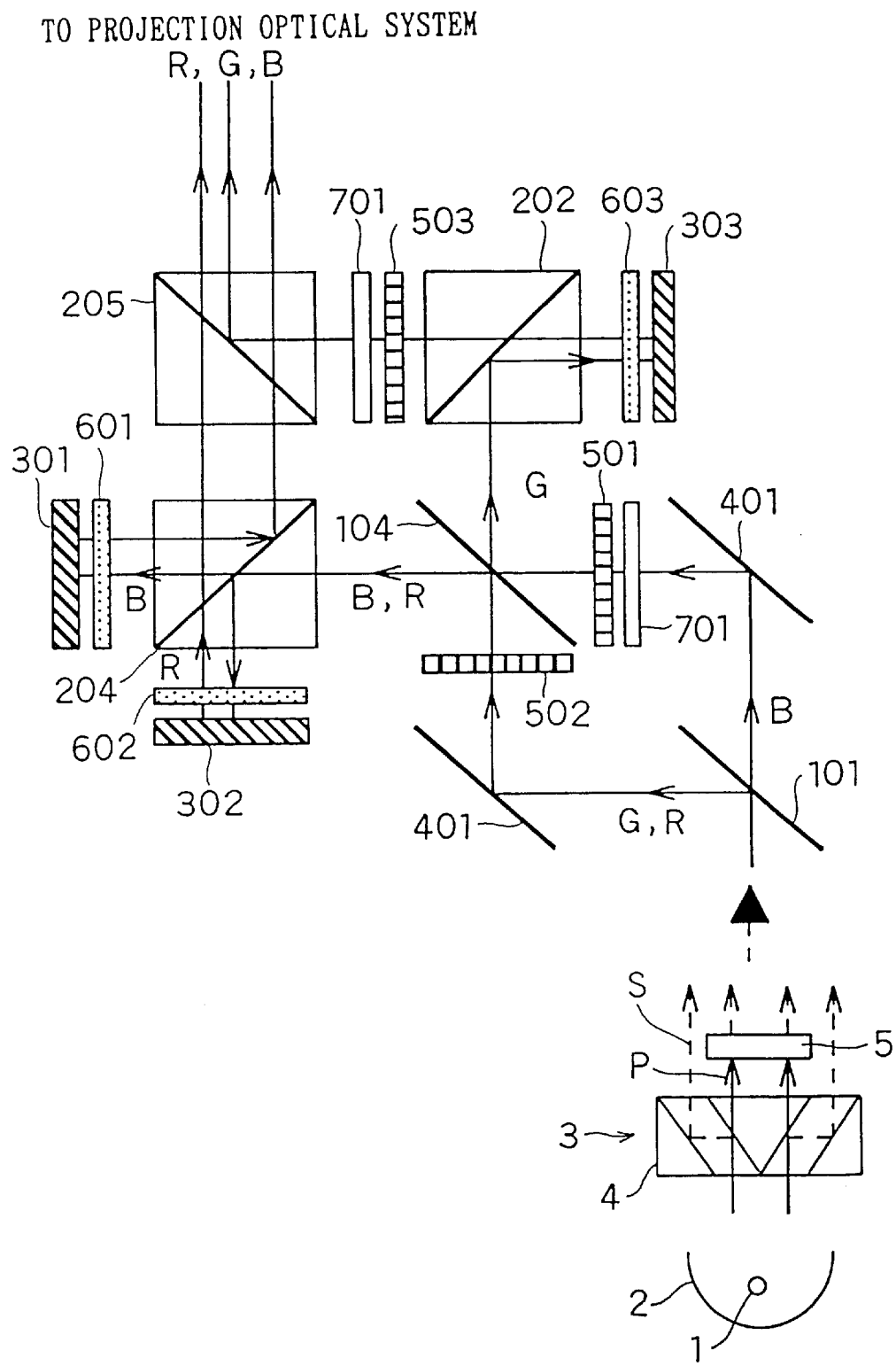
FIG. 2 is a diagram schematically showing a second embodiment of the invention.

FIG. 2 is a diagram schematically showing the second embodiment of the invention. The illumination optical system shown in FIG. 2 is the same as that shown in FIG. 1. Reference numerals 101 and 104 represent dichroic mirrors; reference numerals 202 and 204 represent polarizing beam splitters; reference numeral 205 represents a dichroic prism; reference numerals 301 to 303 represent reflection-type liquid crystal display devices (slantly hatched rectangles); reference numeral 401 represents reflecting mirrors; reference numerals 501 to 503 represent polarizing plates (horizontally or vertically hatched rectangles); reference numerals 601 to 603 represent band-pass filters (dot-filled rectangles); and reference numeral 701 represents half-wave plates (plain rectangles).

As shown in FIG. 2, the illumination light (a white light beam), composed of the light coming directly from the white light source 1 and the light reflected from the reflector 2, first passes through the polarization converter 3, which transmits the S-polarized light component and converts the P-polarized light component into S-polarized light, and then reaches the dichroic mirror 101. Here, out of the now wholly S-polarized white light beam, only the blue (B) component is transmitted, and the other, green (G) and red (R), components are reflected. The B component transmitted through the dichroic mirror 101 is then reflected from one of the reflecting mirrors 401, has its polarization plane rotated by the half-wave plate 701 so as to be converted into P-polarized light, has its polarization direction aligned by the polarizing plate 501, and then reaches the dichroic mirror 104.

On the other hand, in a similar manner, the G and R components reflected from the dichroic mirror 101 are then reflected from the other of the reflecting mirrors 401, have their polarization direction aligned by the polarizing plate 502, and then reach the dichroic mirror 104. Here, the P-polarized B component is transmitted and the S-polarized R component is reflected so that these two components are integrated together. The S-polarized G component is transmitted and thereby separated from the other components.

This S-polarized G component is then reflected from the polarizing beam splitter 202, has its wavelength range trimmed by the band-pass filter 603, and then illuminates the pixels on the reflection-type liquid crystal display device 303. Here, at every moment, those pixels which are used for screen display are turned on so that the S-polarized G component incident on those pixels is reflected after being converted into P-polarized light, and those pixels which are not used are turned off so that the same component incident on those pixels is reflected intact as S-polarized light. The G component reflected from the reflection-type liquid crystal display device 303 reaches the polarizing beam splitter 202 again. Here, only the P-polarized light component of the G component is transmitted. The transmitted component then has its polarization direction aligned by the polarizing plate 503, has its polarizing plane rotated by the half-wave plate 701 so as to be converted into S-polarized light, and is then reflected from the dichroic prism 205.

On the other hand, the P-polarized B component and the S-polarized R component integrated together by the dichroic mirror 104 reach the polarizing beam splitter 204. Here, the P-polarized B component is transmitted, and the S-polarized R component is reflected. These components then have their wavelength ranges trimmed by the band-pass filters 601 and 602, respectively, and then illuminate the pixels on the reflection-type liquid crystal display devices 301 and 302, respectively.

On the reflection-type liquid crystal display device 301, at every moment, those pixels which are used for screen display are turned on so that the P-polarized B component incident on those pixels is reflected after being converted into S-polarized light, and those pixels which are not used are turned off so that the same component incident on those pixels is reflected intact as P-polarized light. The B component reflected from the reflection-type liquid crystal display device 301 reaches the polarizing beam splitter 204 again.

On the reflection-type liquid crystal display device 302, at every moment, those pixels which are used for screen display are turned on so that the S-polarized R component incident on those pixels is reflected after being converted into P-polarized light, and those pixels which are not used are turned off so that the same component incident on those pixels is reflected intact as S-polarized light. The R component reflected from the reflection-type liquid crystal display device 302 reaches the polarizing beam splitter 204 again. Here, the S-polarized B component is reflected and the P-polarized R component is transmitted so that these two components are integrated together.

These S-polarized B component and P-polarized R component integrated together reach the dichroic prism 205, through which they are transmitted so as to be integrated together with the previously mentioned S-polarized G component. In this way, the components of three primary colors are integrated together, which are then directed to a projection optical system (not shown). Note that, instead of the dichroic prism 205 for reflecting the G component and transmitting the R and B components, it is possible to use a dichroic mirror for the same purposes.

Figure 3:
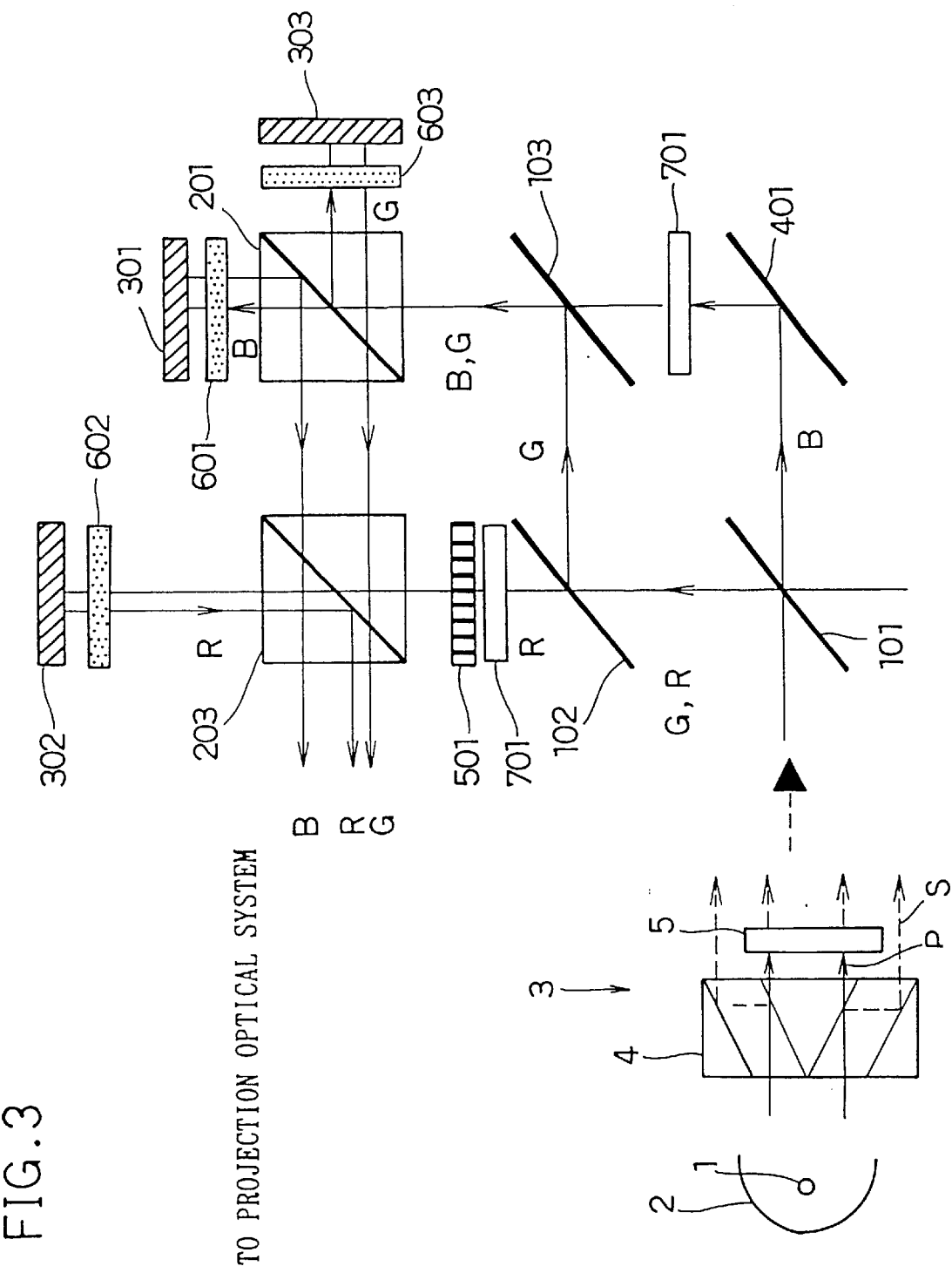
FIG. 3 is a diagram schematically showing a third embodiment of the invention.

FIG. 3 is a diagram schematically showing a third embodiment of the invention. In FIG. 3, reference numeral 1 represents a white light source;

reference numeral 2 represents a reflector, disposed so as to surround the white light source 1, for reflecting the light emitted from the white light source 1; and reference numeral 3 represents a polarization converter, disposed by the side of the white light source 1, for converting the light from the white light source 1 into light polarized on a predetermined polarization plane. As noted earlier, in this embodiment, it is assumed that the light from the light source is used after being converted into S-polarized light. The illumination optical system shown in FIG. 3 is the same as those shown in FIGS. 1 and 2.

Moreover, in FIG. 3, reference numerals 101 to 103 represent dichroic mirrors; reference numeral 201 represents a polarizing beam splitter; reference numeral 203 represents a dichroic polarizing beam splitter; reference numerals 301 to 303 represent reflection-type liquid crystal display devices (slantly hatched rectangles); reference numeral 401 represents a reflecting mirror; reference numeral 501 represents a polarizing plate (a vertically hatched rectangles); reference numerals 601 to 603 represent band-pass filters (dot-filled rectangles); and reference numeral 701 represent half-wave plates (plain rectangles).

As shown in FIG. 3, the illumination light (a white light beam), composed of the light coming directly from the white light source 1 and the light reflected from the reflector 2, first passes through the polarization converter 3, which transmits the S-polarized light component and converts the P-polarized light component into S-polarized light, and then reaches the dichroic mirror 101. Here, out of the now wholly S-polarized white light beam, only the blue (B) component is transmitted, and the other, green (G) and red (R), components are reflected.

The B component transmitted through the dichroic mirror 101 is then reflected from the reflecting mirror 401, has its polarization plane rotated by the half-wave plate 701 so as to be converted into P-polarized light, and then reaches the dichroic mirror 103. On the other hand, the G and R components reflected from the dichroic mirror 101 reach the dichroic mirror 102. Here, the S-polarized G component is reflected and the S-polarized R component is transmitted so that these two components are separated from each other. The S-polarized G component then reaches the dichroic mirror 103. Here, The S-polarized G component is reflected and the P-polarized B component is transmitted so that these two components are integrated together.

The S-polarized R component transmitted through the dichroic mirror 102 then has its polarization plane rotated by the half-wave plate 701 so as to be converted into P-polarized light, has its polarization direction aligned by the polarizing plate 501, reaches the dichroic polarizing beam splitter 203 so as to be transmitted therethrough, has its wavelength range trimmed by the band-pass filter 602, and then illuminates the pixels on the reflection-type liquid crystal display device 302. Here, at every moment, those pixels which are used for screen display are turned on so that the P-polarized R component incident on those pixels is reflected after being converted into S-polarized light, and those pixels which are not used are turned off so that the same component incident on those pixels is reflected intact as P-polarized light. The R component reflected from the reflection-type liquid crystal display device 302 reaches the dichroic polarizing beam splitter 203 again. Here, only the S-polarized light component of the R component is reflected.

On the other hand, the P-polarized B component and the S-polarized G component integrated together by the dichroic mirror 103 reach the polarizing beam splitter 201. Here, the P-polarized B component is transmitted and the S-polarized G component is reflected. These components then have their wavelength ranges trimmed by the band-pass filters 601 and 603, respectively, and then illuminate the pixels on the reflection-type liquid crystal display devices 301 and 303, respectively.

On the reflection-type liquid crystal display device 301, at every moment, those pixels which are used for screen display are turned on so that the P-polarized B component incident on those pixels is reflected after being converted into S-polarized light, and those pixels which are not used are turned off so that the same component incident on those pixels is reflected intact as P-polarized light. The B component reflected from the reflection-type liquid crystal display device 301 reaches the polarizing beam splitter 201 again.

On the reflection-type liquid crystal display device 303, at every moment, those pixels which are used for screen display are turned on so that the S-polarized G component incident on those pixels is reflected after being converted into P-polarized light, and those pixels which are not used are turned off so that the same component incident on those pixels is reflected intact as S-polarized light. The G component reflected from the reflection-type liquid crystal display device 303 reaches the polarizing beam splitter 201 again. Here, the S-polarized B component is reflected and the P-polarized G component is transmitted so that these two components are integrated together.

These S-polarized B component and P-polarized G component integrated together reach the dichroic polarizing beam splitter 203, through which they both are transmitted so as to be integrated together with the previously mentioned S-polarized R component. In this way, the components of three primary colors are integrated together, which are then directed to a projection optical system (not shown).

In the arrangement shown in FIG. 3, what corresponds to the elements 202 and 206 in the arrangement shown in FIG. 1, or what corresponds to the elements 202 and 205 in the arrangement shown in FIG. 2, is realized by the use of a single element. This makes the arrangement shown in FIG. 3 more inexpensive than those shown in FIGS. 1 and 2. Note that the first to third embodiments described above are all designed to have the same back focal length (i.e. the distance from the projection optical system to the reflection-type liquid crystal display device) or all of the color components.

Figure 4A:
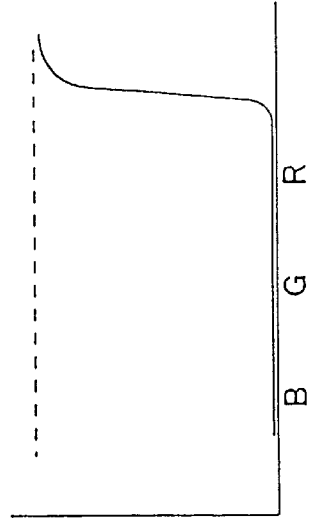
FIGS. 4A to 4D are diagrams showing the transmittance characteristic of the polarizing beam splitters.

FIGS. 4A to 4D are diagrams showing the transmittance characteristic, for the wavelength ranges of the individual color components, of the polarizing beam splitters employed in the first to third embodiments, with FIGS. 4A to 4D showing the transmittance characteristic of the polarizing beam splitters 201 to 204, respectively. In these diagrams, a broken line indicates P-polarized light, and a solid line indicates S-polarized light. As shown in FIG. 4A, the polarizing beam splitter 201 is designed to transmit almost 100% of the P-polarized light within the wavelength ranges of the B and G components and reflect almost 100% of the S-polarized light within the wavelength ranges of the B and G components.

Figure 4D:
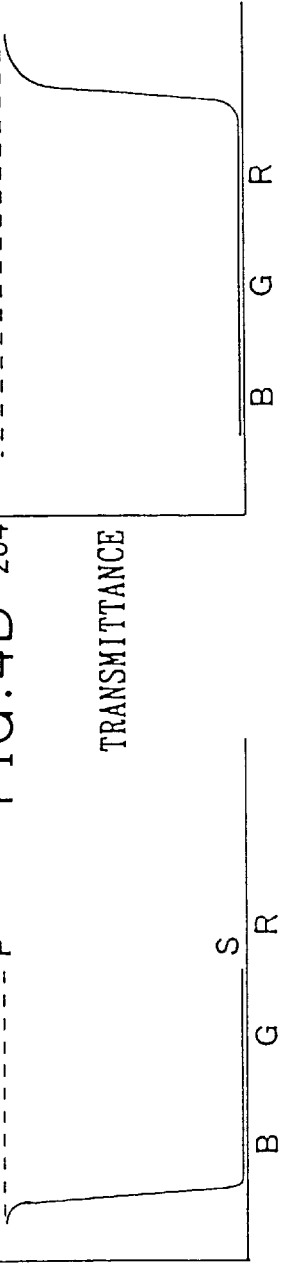
Figure 4B:
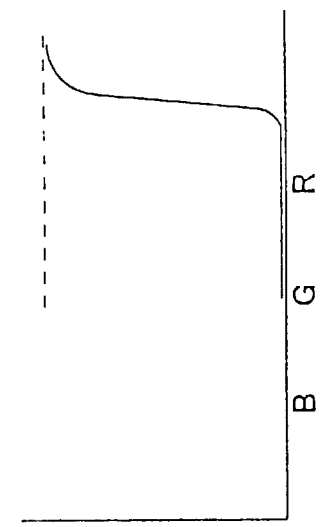

As shown in FIG. 4B, the polarizing beam splitter 202 is designed to transmit almost 100% of the P-polarized light within the wavelength ranges of the G and R components and reflect almost 100% of the S-polarized light within the wavelength ranges of the G and R components.

Figure 4C:
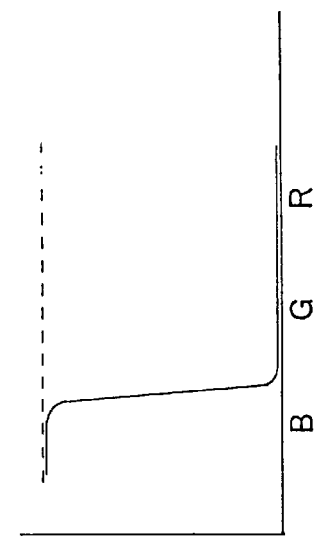

As shown in FIG. 4C, the dichroic polarizing beam splitter 203 is designed to transmit almost 100% of the P-polarized light within the wavelength ranges of the B, G, and R components, transmit almost 100% of the S-polarized light in the wavelength range of the B component, and reflect almost 100% of the S-polarized light within the wavelength ranges of the G and R components.

As shown in FIG. 4D, the polarizing beam splitter 204 is designed to transmit almost 100% of the P-polarized light within the wavelength ranges of the B, G, and R components and reflect almost 100% of the S-polarized light within the wavelength ranges of the B, G, and R components.

The polarizing beam splitters described above each employ a prism-type polarizing element called a MacNeile polarizing element. The various characteristics of these polarizing beam splitters are achieved by laying layers of two different refractive indices alternately over one another.

FIG. 5 is a diagram schematically showing a fourth embodiment of the invention. In FIG. 5, reference numeral 1 represents a white light source; reference numeral 2 represents a reflector, disposed so as to surround the white light source 1, for reflecting the light emitted from the white light source 1; and reference numeral 3 represents a polarization converter, disposed by the side of the white light source 1, for converting the light from the white light source 1 into light polarized on a predetermined polarization plane. In this embodiment, it is assumed that the light from the light source is used after being converted into P-polarized light with respect to the mirrors, prisms, and other optical elements used.

This polarization converter 3 is composed of a polarizing beam splitter 4 for internally reflecting the S-polarized light component, indicated by the broken-line arrow S, and transmitting the P-polarized light component, indicated by the solid- line arrow P, in such a way that they both pass therethrough, and a half-wave plate 5 for rotating the polarization plane of the S-polarized light component that has passed therethrough so as to convert it into P-polarized light. The components noted thus far constitute an illumination optical system. Although not shown, it is customary to additionally use an integrator optical system to minimize unevenness of the illumination light of this illumination optical system.

Moreover, in FIG. 5, reference numerals 101 and 102 represent dichroic mirrors; reference numerals 201a and 203a represent dichroic polarizing beam splitters; reference numeral 202a represents a polarizing beam splitter; reference numerals 301 to 303 represent reflection-type liquid crystal display devices (slantly hatched rectangles); reference numeral 401 represents reflecting mirrors; reference numerals 501 to 503 and 507 represent polarizing plates (horizontally or vertically hatched rectangles); reference numerals 601 to 603 represent band-pass filters (dot-filled rectangles); reference numeral 701 represents half-wave plates (plain rectangles); and reference numeral 6 represents a relay optical system for compensating the optical path length.

As shown in FIG. 5, the illumination light (a white light beam), composed of the light coming directly from the white light source 1 and the light reflected from the reflector 2, first passes through the polarization converter 3, which transmits the P-polarized light component and converts the S-polarized light component into P-polarized light, and then reaches the dichroic mirror 101. Here, out of the now wholly P-polarized white light beam, only the blue (B) component is transmitted, and the other, green (G) and red (R), components are reflected.

The B component transmitted through the dichroic mirror 101 is then reflected from the first reflecting mirror 401, passes through the relay optical system 6, is further reflected from the second and then third reflecting mirror 401, has its polarization direction aligned by the polarizing plate 503, and then reaches the dichroic polarizing beam splitter 203a. Here, the P-polarized B component is transmitted. This component is then transmitted through the dichroic polarizing beam splitter 201a, has its wavelength range trimmed by the band-pass filter 601, and then illuminates the pixels on the reflection-type liquid crystal display device 301.

On the reflection-type liquid crystal display device 301, at every moment, those pixels which are used for screen display are turned on so that the P-polarized B component incident on those pixels is reflected after being converted into S-polarized light, and those pixels which are not used are turned off so that the same component incident on those pixels is reflected intact as P-polarized light. The B component reflected from the reflection-type liquid crystal display device 301 reaches the dichroic polarizing beam splitter 201a again. Here, the S-polarized B component is transmitted, which is then reflected from the dichroic polarizing beam splitter 203a.

On the other hand, the G and R components reflected from the dichroic mirror 101 reach the dichroic mirror 102. Here, the P-polarized R component is transmitted and the P-polarized G component is reflected so that the two components are separated from each other. The P-polarized R component then has its polarization plane rotated by the half-wave plate 701 so as to be converted into S-polarized light, has its polarization direction aligned by the polarizing plate 502, is reflected from the polarizing beam splitter 202a, has its wavelength range trimmed by the band-pass filter 602, and then illuminates the pixels on the reflection-type liquid crystal display device 302.

Here, at every moment, those pixels which are used for screen display are turned on so that the S-polarized R component incident on those pixels is reflected after being converted into P-polarized light, and those pixels which are not used are turned off so that the same component incident on those pixels is reflected intact as S-polarized light. The R component reflected from the reflection-type liquid crystal display device 302 reaches the polarizing beam splitter 202a again. Here, only the P-polarized R component is transmitted, which then has its polarization plane rotated by the half-wave plate 701 so as to be converted into S-polarized light, and is then transmitted through the dichroic polarizing beam splitter 203a.

The P-polarized G component separated by the dichroic mirror 102 has its polarization direction aligned by the polarizing plate 501, and then reaches the a dichroic polarizing beam splitter 201a. Here, the P-polarized G component is transmitted, which then has its wavelength range trimmed by the band-pass filter 603, and then illuminates the pixels on the reflection-type liquid crystal display device 303.

On the reflection-type liquid crystal display device 303, at every moment, those pixels which are used for screen display are turned on so that the P-polarized G component incident on those pixels is reflected after being converted into S-polarized light, and those pixels which are not used are turned off so that the same component incident on those pixels is reflected intact as P-polarized light. The G component reflected from the reflection-type liquid crystal display device 303 reaches the dichroic polarizing beam splitter 201a again. Here, the S-polarized G component is reflected, which is then further reflected from the dichroic polarizing beam splitter 203a.

Finally, the R, G, and B components, now all S-polarized, are integrated together by the dichroic polarizing beam splitter 203a. In this way, the components of three primary colors are integrated together, which then have their polarization direction aligned by the polarizing plate 507, and are directed to a projection optical system (not shown).

Figure 6:
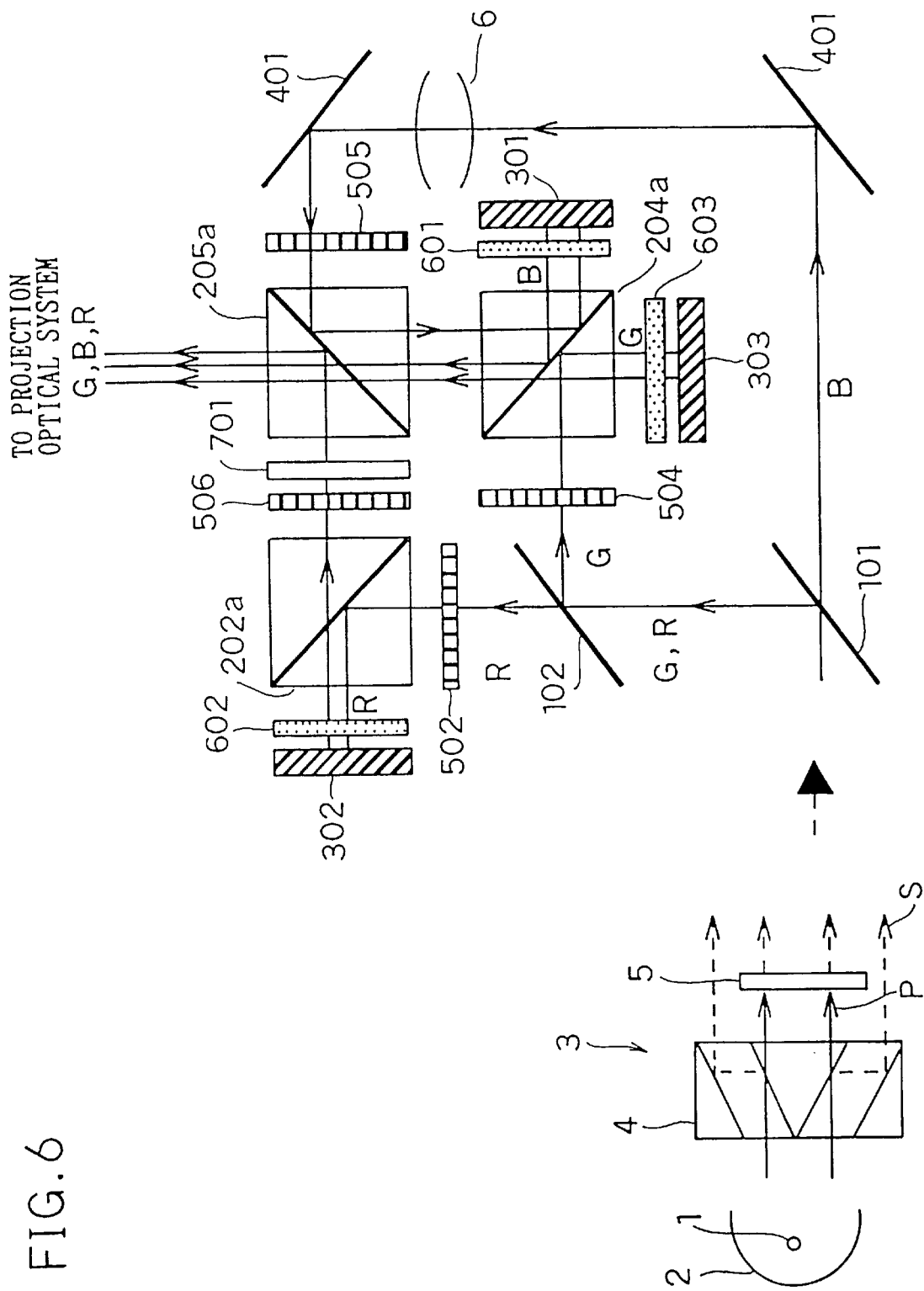
FIG. 6 is a diagram schematically showing a fifth embodiment of the invention.

FIG. 6 is a diagram schematically showing a fifth embodiment of the invention. In FIG. 6, reference numeral 1 represents a white light source; reference numeral 2 represents a reflector, disposed so as to surround the white light source 1, for reflecting the light emitted from the white light source 1; and reference numeral 3 represents a polarization converter, disposed by the side of the white light source 1, for converting the light from the white light source 1 into light polarized on a predetermined polarization plane. In this embodiment, it is assumed that the light from the light source is used after being converted into S-polarized light with respect to the mirrors, prisms, and other optical elements used.

This polarization converter 3 is composed of a polarizing beam splitter 4 for internally reflecting the S-polarized light component, indicated by the broken-line arrow S, and transmitting the P-polarized light component, indicated by the solid-line arrow P, in such a way that they both pass therethrough, and a half-wave plate 5 for rotating the polarization plane of the transmitted P-polarized light component so as to convert it into S-polarized light. The components noted thus far constitute an illumination optical system. Although not shown, it is customary to additionally use an integrator optical system to minimize unevenness of the illumination light of this illumination optical system.

Moreover, in FIG. 6, reference numerals 101 and 102 represent dichroic mirrors; reference numeral 204a represents a dichroic polarizing beam splitter; reference numerals 202a and 205a represent polarizing beam splitters; reference numerals 301 to 303 represent reflection-type liquid crystal display devices (slantly hatched rectangles); reference numeral 401 represents reflecting mirrors; reference numerals 502 and 504 to 506 represent polarizing plates (horizontally or vertically hatched rectangles); reference numerals 601 to 603 represent band-pass filters (dot-filled rectangles); reference numeral 701 represents a half-wave plate (a plain rectangle); and reference numeral 6 represents a relay optical system for compensating the optical path length.

As shown in FIG. 6, the illumination light (a white light beam), composed of the light coming directly from the white light source 1 and the light reflected from the reflector 2, first passes through the polarization converter 3, which transmits the S-polarized light component and converts the P-polarized light component into S-polarized light, and then reaches the dichroic mirror 101. Here, out of the now wholly S-polarized white light beam, only the blue (B) component is transmitted, and the other, green (G) and red (R), components are reflected.

The B component transmitted through the dichroic mirror 101 is then reflected from the first reflecting mirror 401, passes through the relay optical system 6, is further reflected from the second reflecting mirror 401, has its polarization direction aligned by the polarizing plate 505, and then reaches the polarizing beam splitter 205a. Here, the S-polarized B component is reflected.

This component is then further reflected from the dichroic polarizing beam splitter 204a, has its wavelength range trimmed by the band-pass filter 601, and then illuminates the pixels on the reflection-type liquid crystal display device 301.

On the reflection-type liquid crystal display device 301, at every moment, those pixels which ate used for screen display are turned on so that the S-polarized B component incident on those pixels is reflected after being converted into P-polarized light, and those pixels which are not used are turned off so that the same component incident on those pixels is reflected intact as S-polarized light. The B component reflected from the reflection-type liquid crystal display device 301 reaches the dichroic polarizing beam splitter 204a again. Here, the P-polarized B component is reflected, which is then transmitted through the polarizing beam splitter 205a.

On the other hand, the G and R components reflected from the dichroic mirror 101 reach the dichroic mirror 102. Here, the S-polarized R component is transmitted and the S-polarized G component is reflected so that the two components are separated from each other. The S-polarized R component then has its polarization direction aligned by the polarizing plate 502, is reflected from the polarizing beam splitter 202a, has its wavelength range trimmed by the band-pass filter 602, and then illuminates the pixels on the reflection-type liquid crystal display device 302.

Here, at every moment, those pixels which are used for screen display are turned on so that the S-polarized R component incident on those pixels is reflected after being converted into P-polarized light, and those pixels which are not used are turned off so that the same component incident on those pixels is reflected intact as S-polarized light. The R component reflected from the reflection-type liquid crystal display device 302 reaches the polarizing beam splitter 202a again. Here, only the P-polarized R component is transmitted, which then has its polarization direction aligned by the polarizing plate 506, has its polarization plane rotated by the half-wave plate 701 so as to be converted into S-polarized light, and is then reflected from the polarizing beam splitter 205a.

The S-polarized G component separated by the dichroic mirror 102 has its polarization direction aligned by the polarizing plate 504, and then reaches the dichroic polarizing beam splitter 204a. Here, the S-polarized G component is reflected, which then has its wavelength range trimmed by the band-pass filter 603, and then illuminates the pixels on the reflection-type liquid crystal display device 303.

On the reflection-type liquid crystal display device 303, at every moment, those pixels which are used for screen display are turned on so that the S-polarized G component incident on those pixels is reflected after being converted into P-polarized light, and those pixels which are not used are turned off so that the same component incident on those pixels is reflected intact as S-polarized light. The G component reflected from the reflection-type liquid crystal display device 303 reaches the dichroic polarizing beam splitter 204a again. Here, the P-polarized G component is transmitted, which is then further transmitted through the polarizing beam splitter 205a.

Finally, the G and B components, now P-polarized, and the R component, now S-polarized, are integrated together by the polarizing beam splitter 205a. In this way, the components of three primary colors are integrated together, which are then directed to a projection optical system (not shown). Note that the fourth and fifth embodiments described above are both designed to have the same back focal length (i.e. the distance from the projection optical system to the reflection-type liquid crystal display device) for all of the color components.

Figure 7A:
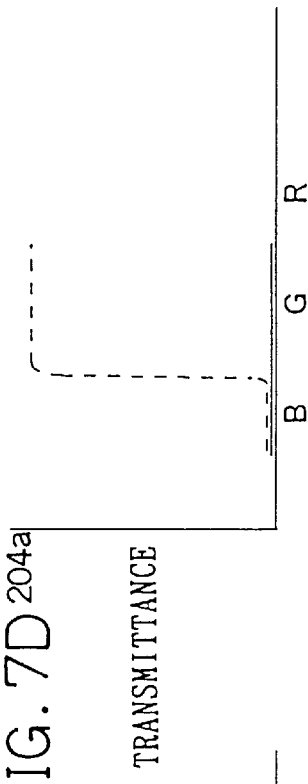
FIGS. 7A to 7E are diagrams showing the transmittance characteristic of the polarizin beam splitters.

FIGS. 7A to 7E are diagrams showing the transmittance characteristic, for the wavelength ranges of the individual color components, of the polarizing beam splitters employed in the fourth and fifth embodiments, with FIGS. 7A to 7E showing the transmittance characteristic of the polarizing beam splitters 201a to 205a, respectively. In these diagrams, a broken line indicates P-polarized light, a and a solid line indicates S-polarized light. As shown in FIG. 7A, the dichroic polarizing beam splitter 201a is designed to transmit almost 100% of the P-polarized light within the wavelength ranges of the B and G components, transmit almost 100% of the S-polarized light within the wavelength range of the B component, and reflect almost 100% of the S-polarized light within the wavelength range of the G component.

Figure 7B:
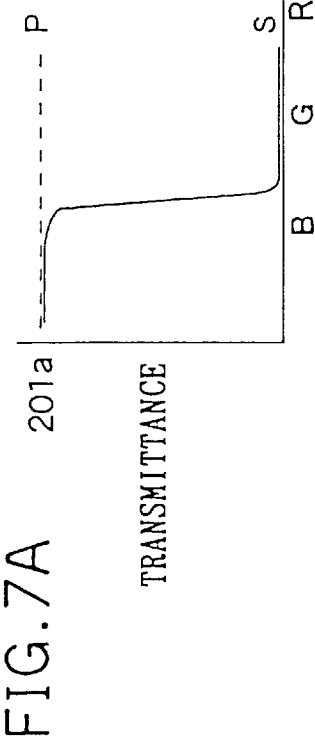

As shown in FIG. 7B, the polarizing beam splitter 202a is designed to transmit almost 100% of the P-polarized light within the wavelength ranges of the G and R components and reflect almost 100% of the S-polarized light within the wavelength ranges of the G and R components.

Figure 7C:
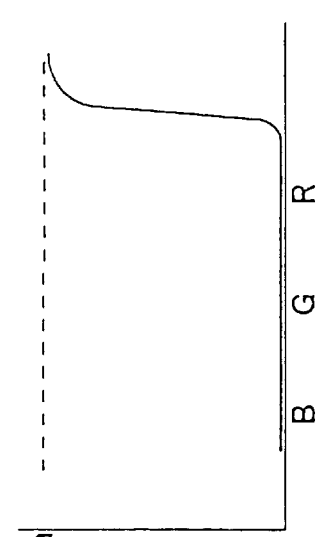

As shown in FIG. 7C, the dichroic polarizing beam splitter 203a is designed to transmit almost 100% of the P-polarized light within the wavelength ranges of the B, G, and R components, transmit almost 100% of the S-polarized light in the wavelength range of the R component, and reflect almost 100% of the S-polarized light within the wavelength ranges of the G and B components.

Figure 7D:
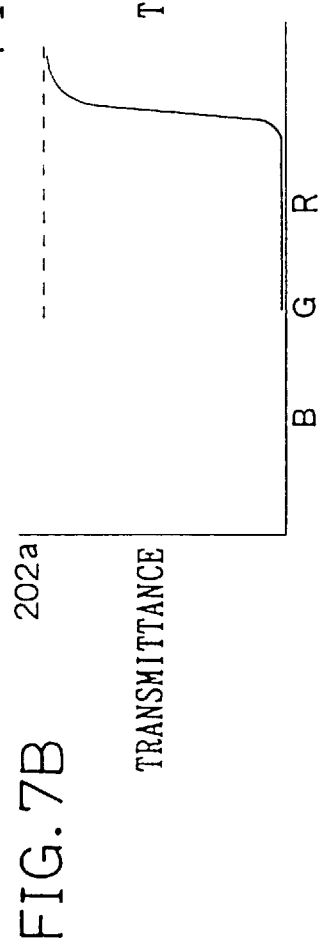

As shown in FIG. 7D, the dichroic polarizing beam splitter 204a is designed to transmit almost 100% of the P-polarized light within the wavelength range of the G component, reflect almost 100% of the P-polarized light within the wavelength range of the B component, and reflect almost 100% of the S-polarized light within the wavelength ranges of the B and G components.

Figure 7E:
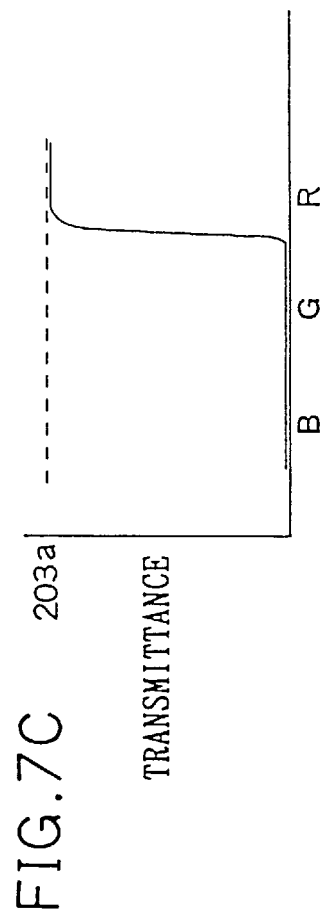

As shown in FIG. 7E, the polarizing beam splitter 205a is designed to transmit almost 100% of the P-polarized light within the wavelength ranges of the B, G, and R components and reflect almost 100% of the S-polarized light within the wavelength ranges of the B, G, and R components.

The polarizing beam splitters described above each employ a prism-type polarizing element called a MacNeile polarizing element. The various characteristics of these polarizing beam splitters are achieved by laying layers of two different refractive indices alternately over one another.

Figure 8:
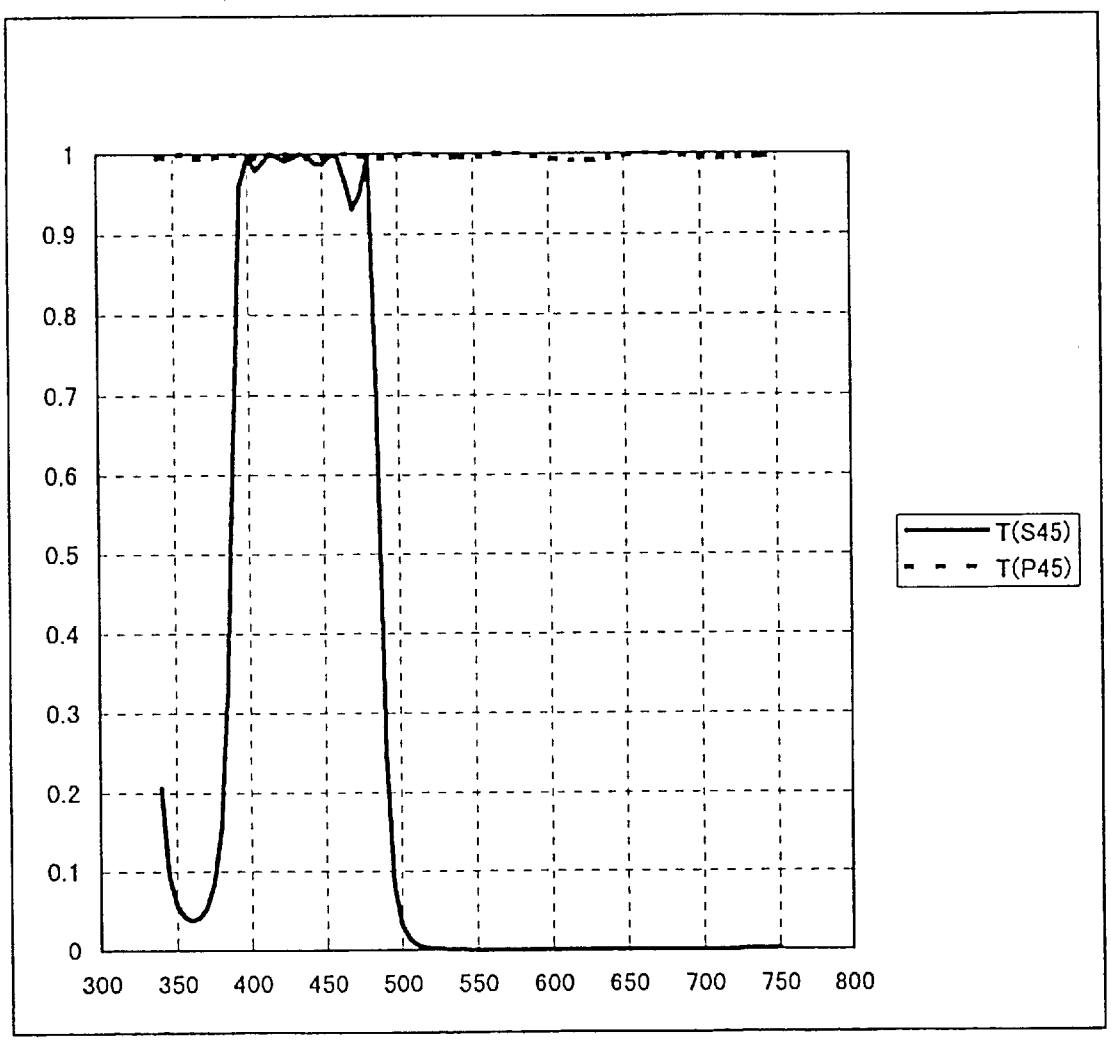
FIG. 8 is a graph showing a practical example of the transmittance characteristic (film characteristic)
Figure 9:
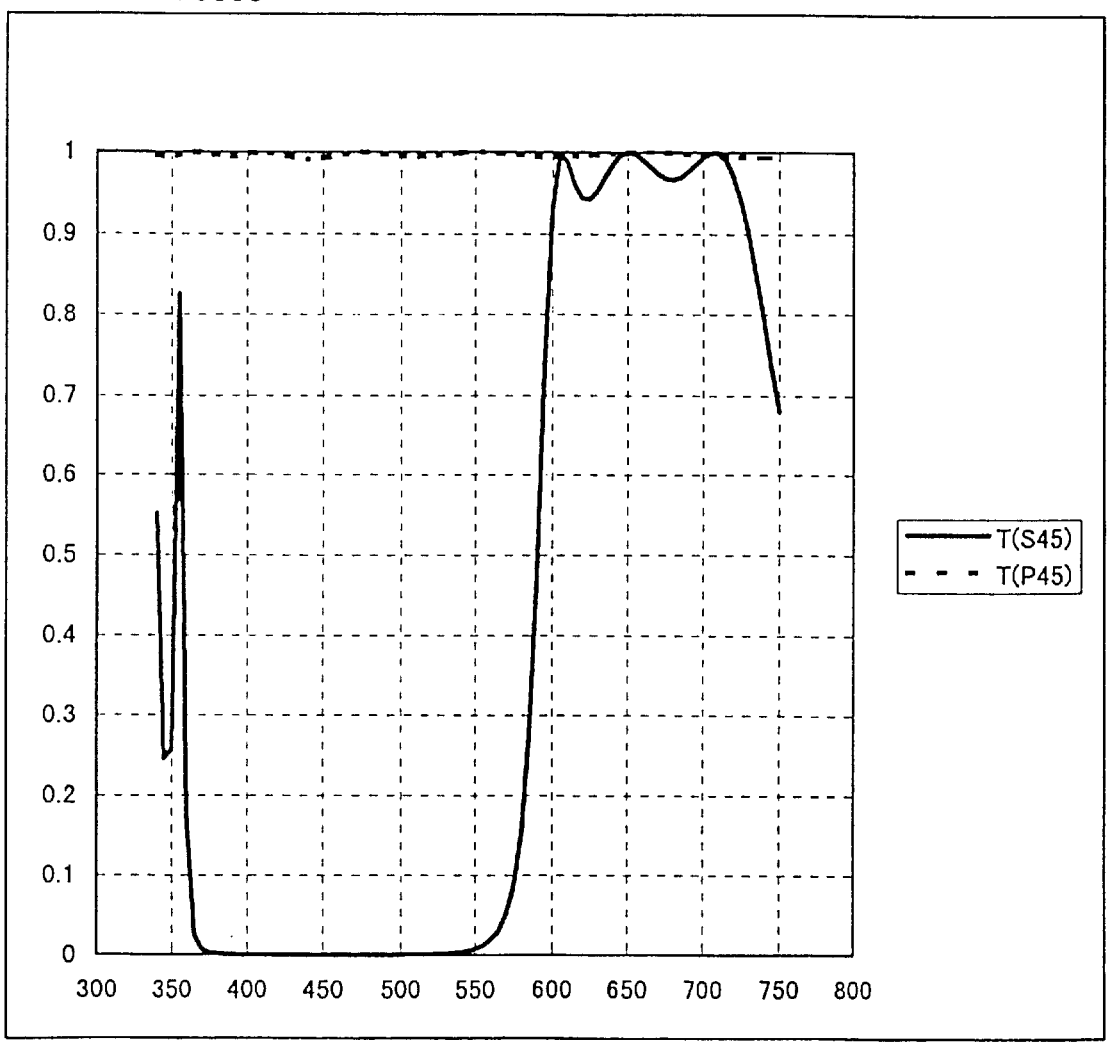
FIG. 9 is a graph showing another practical example of the transmittance characteristic (film characteristic).

FIGS. 8 and 9 are graphs showing practical examples of the transmittance characteristic (film characteristic) of the polarizing beam splitters. FIG. 8 shows a characteristic that corresponds to the dichroic polarizing beam splitter 201a. In this graph, the broken line indicates P-polarized light and the solid line indicates S-polarized light. The characteristic shown in FIG. 8 is obtained by forming 17 coating film layers between glass prisms (regarded as the 0th and 18th layers) in such a way that the individual layers have refractive indices and optical film thicknesses $(nd/\lambda_0)$ as listed in Table 1. Note that, here, the reference wavelength $\lambda_0$ is assumed to be 865.8356 nm.

FIG. 9 shows a characteristic that corresponds to the dichroic polarizing beam splitter 203a. In this graph, the broken line indicates P-polarized light and the solid line indicates S-polarized light. The characteristic shown in FIG. 9 is obtained by forming 17 coating film layers between glass prisms (regarded as the 0th and 18th layers) in such a way that the individual layers have refractive indices and optical film thicknesses $(nd/\lambda_0)$ as listed in Table 2. Note that, here, the reference wavelength X, is assumed to be 650.9595 nm.

TABLE 1

| Layer | Refractive Index | Optical Film Thickness $(nd/\lambda_0)$ |
|---|---|---|
| 18 | 1.62 | |
| 17 | 1.62 | 0.125 |
| 16 | 2.05 | 0.214 |
| 15 | 1.385 | 0.393 |
| 14 | 2.05 | 0.178 |
| 13 | 1.385 | 0.307 |
| 12 | 2.05 | 0.255 |
| 11 | 1.385 | 0.262 |
| 10 | 2.05 | 0.183 |
| 9 | 1.385 | 0.391 |
| 8 | 2.05 | 0.183 |
| 7 | 1.385 | 0.262 |
| 6 | 2.05 | 0.255 |
| 5 | 1.385 | 0.307 |
| 4 | 2.05 | 0.179 |
| 3 | 1.385 | 0.393 |
| 2 | 2.05 | 0.214 |
| 1 | 1.62 | 0.125 |
| 0 | 1.62 | |

TABLE 1-continued

TABLE 2

| Layer | Refractive Index | Optical Film Thickness $(nd/\lambda_0)$ |
|---|---|---|
| 18 | 1.62 | |
| 17 | 1.62 | 0.125 |
| 16 | 2.05 | 0.249 |
| 15 | 1.385 | 0.270 |
| 14 | 2.05 | 0.133 |
| 13 | 1.385 | 0.314 |
| 12 | 2.05 | 0.240 |
| 11 | 1.385 | 0.345 |
| 10 | 2.05 | 0.199 |
| 9 | 1.385 | 0.236 |
| 8 | 2.05 | 0.199 |
| 7 | 1.385 | 0.345 |
| 6 | 2.05 | 0.240 |
| 5 | 1.385 | 0.314 |
| 4 | 2.05 | 0.133 |
| 3 | 1.385 | 0.270 |
| 2 | 2.05 | 0.249 |
| 1 | 1.62 | 0.125 |
| 0 | 1.62 | |

What is claimed is:

1. A projection display apparatus comprising:
a first dichroic reflecting surface for separating a polarized light beam into a first light beam of a first wavelength range and a second light beam of a second wavelength range;
a wavelength plate for rotating a polarization plane of the first light beam;
a second dichroic reflecting surface for integrating at least a first portion of the first light beam, after rotation of the polarization plane of the first light beam, and at least a first portion of the second light beam;
a first polarizing beam splitter for reflecting one and transmitting the other of the at least a first portion of the first light beam and the at least a first portion of the second light beam after integration of the at least a first portion of the first light beam and the at least a first portion of the second light beam by the second dichroic reflecting surface;
a first reflection-type liquid crystal display device for modulating and reflecting a light beam reflected from the first polarizing beam splitter; and
a second reflection-type liquid crystal display device for modulating and reflecting a light beam transmitted through the first polarizing beam splitter,
wherein the first polarizing beam splitter transmits a light beam coming from the first reflection-type liquid crystal display device and reflects a light beam coming from the second reflection-type liquid crystal display device so as to integrate the light beam coming from the first reflection-type liquid crystal display device and the light beam coming from the second reflection-type liquid crystal display device.

2. A projection display apparatus as claimed in claim 1, wherein the second dichroic reflecting surface further separates a third light beam of a third wavelength range from one of the first and second light beams.

3. A projection display apparatus as claimed in claim 2, further comprising:
a second polarizing beam splitter for reflecting the third light beam; and
a third reflection-type liquid crystal display device for modulating and reflecting the third light beam after reflection from the second polarizing beam splitter,
wherein the second polarizing beam splitter transmits a light beam coming from the third reflection-type liquid crystal display device.

4. A projection display apparatus as claimed in claim 3, further comprising:
a dichroic optical element for integrating together the light beam transmitted through the second polarizing beam splitter and the light beams integrated by the first polarizing beam splitter.

5. A projection display apparatus as claimed in claim 1, further comprising:
a third dichroic reflecting surface for separating a third light beam of a third wavelength range from one of the first and second liqht beams;
a second polarizing beam splitter for transmitting the third light beam; and
a third reflection-type liquid crystal display device for modulating and reflecting the light beam transmitted through the second polarizing beam splitter,
wherein the second polarizing beam splitter reflects a light beam coming from the third reflection-type liquid crystal display device so as to integrate the light beam coming from the third reflection-type liquid crystal display device with the light beams integrated by the first polarizing beam splitter.

6. A projection display apparatus as claimed in claim 1, further comprising:
a light source for emitting a light beam; and
a polarization converter for aligning a polarization direction of the light beam coming from the light source with a predetermined polarization plane,
wherein the thus polarized light beam coming from the polarization converter is shone onto the first dichroic reflecting surface.

7. A projection display apparatus as claimed in claim 1, wherein said polarized light beam comprises light beams of red, green, and blue wavelength ranges, and
wherein the light beam coming from the second reflection-type liquid crystal display device and reflected from the first polarizing beam splitter is the light beam of the blue wavelength range.

8. A projection display apparatus as claimed in claim 2, wherein said polarized light beam comprises light beams of red, green, and blue wavelength ranges, and
wherein the third light beam is the light beam of the red wavelength range.

9. A projection display apparatus as claimed in claim 2, wherein said polarized light beam comprises light beams of red, green, and blue wavelength ranges, and
wherein the third light beam is the light beam of the green wavelength range.

10. A projection display apparatus as claimed in claim 1, further comprising: first and second polarizing plates for flattening a polarization plane of a corresponding first and second liqht beam, the first and second polarizinq plates being disposed in front of the second dichroic reflecting surface.

11. A projection display apparatus as claimed in claim 3, further comprising first, second, and third band-pass filters disposed over a front surface of a respective first, second, and third reflection-type liquid crystal display device, the first, second, and third band-pass filters for passing a corresponding wavelength range of a light beam shone onto the respective first, second, and third reflection-type liquid crystal display devices.

12. A projection display apparatus as claimed in claim 4, further comprising a projection optical system for projecting the light beams integrated by the dichroic optical element.

13. An illumination optical system comprising:
a separator for separating a light beam from a light source into a first light beam of a first wavelength range and a second light beam of a second wavelength range;
a processor for optically processing one of the first light beam and the second light beam; and
a separating/integrating optical element for separating a third light beam of a third wavelength range from the second light beam and integrating the first light beam and a portion of the second light beam that remains after separation of the third light beam.

14. A projection display apparatus comprising:
a first dichroic reflecting surface for separating a source light beam into a first light beam of a first wavelength range and a second light beam of a second wavelength range;
a first reflector for reflecting the first light beam in a first direction;
a second reflector for reflecting the second light beam in a second direction, the second direction being different from the first direction;
a dichroic polarizing beam splitter that transmits the first and second light beams shone onto it from the first and second directions;
a first reflection-type liquid crystal display device for modulating and reflecting a first of the first light beam and the second light beam transmitted through the dichroic polarizing beam splitter; and
a second reflection-type liquid crystal display device for modulating and reflecting a second of the first light beam and the second light beam transmitted through the dichroic polarizing beam splitter,
wherein the dichroic polarizing beam splitter transmits a light beam coming from the first reflection-type liquid crystal display device and reflects a light beam coming from the second reflection-type liquid crystal display device so as to integrate the light beam coming from the first reflection-type liquid crystal display device and the light beam coming from the second reflection-type liquid crystal display device.

15. A projection display apparatus as claimed in claim 14, further comprising:
a polarizing beam splitter for transmitting or reflecting the first light beam before it is shone onto the dichroic polarizing beam splitter,
wherein the polarizing beam splitter transmits or reflects the light beams integrated by the dichroic polarizing beam splitter.

16. A projection display apparatus as claimed in claim 14, further comprising:
a second dichroic reflecting surface for separating a third light beam of a third wavelength range from the second light beam;
a first polarizing beam splitter for reflecting the third light beam; and a third reflection-type liquid crystal display device for modulating and reflecting the third light beam after reflection by the first polarizing beam splitter, wherein the first polarizing beam splitter transmits a light beam coming from the third reflection-type liquid crystal display device.

17. A projection display apparatus as claimed in claim 14, further comprising first and second polarizing plates for flattening a polarization plane of a corresponding first and second light beam, the first and second polarizing plates being disposed in front of the dichroic polarizing beam splitter.

18. A projection display apparatus as claimed in claim 14, wherein the source light beam is a polarized source light beam.

19. A projection display apparatus as claimed in claim 14, further comprising:

a light source for emitting a source light beam; and a polarization converter for aligning a polarization direction of the source light beam coming from the light source with a predetermined polarization plane, wherein the thus polarized source light beam coming from the polarization converter is shone onto the first dichroic reflecting surface.

20. A projection display apparatus as claimed in claim 15, wherein said source light beam comprises light beams of red, green, and blue wavelength ranges, and wherein the first light beam is the light beam of the blue wavelength range.

21. A projection display apparatus as claimed in claim 16, further comprising:

a second polarizing beam splitter for integrating together the light beam transmitted through the first polarizing beam splitter and the light beams intergrate together by the dichroic polarizing beam splitter.

22. A projection display apparatus as claimed in claim 16, wherein said source light beam comprises light beams of red, green, and blue wavelength ranges, and wherein the third light beam is the light beam of the red wavelength range.

23. A projection display apparatus as claimed in claim 16, wherein said source light beam comprises light beams of red, green, and blue wavelength ranges, and wherein a portion of the second light beam that remains after separation of the third light beam is the light beam of the green wavelength range.

24. A projection display apparatus as claimed in claim 16, further comprising first, second, and third band-pass filters disposed over a front surface of a respective first, second, and third reflection-type liquid crystal display device, the first, second, and third band-pass filters for passing a corresponding wavelength range of a light beam shone onto the respective first, second, and third reflection-type liquid crystal display devices.

25. A projection display apparatus as claimed in claim 21, further comprising a projection optical system for projecting the light beams integrated by the second polarizing beam splitter.

26. A projection display apparatus as claimed in claim 21, further comprising a wavelength plate for rotating a polarization plane of the third light beam before the third light beam enters the second polarizing beam splitter.

27. A projection display apparatus comprising:

a first dichroic reflecting surface for separating a source light beam into a first light beam of a first wavelength range and a second light beam of a second wavelength range;

a first reflector for reflecting the first light beam in a first direction;

a second reflector for reflecting the second light beam in a second direction, the second direction being different from the first direction;

a dichroic polarizing beam splitter that reflects the first and second light beams shone onto it from the first and second directions;

a first reflection-type liquid crystal display device for modulating and reflecting a first of the first light beam and the second light beam reflected from the dichroic polarizing beam splitter; and a second reflection-type liquid crystal display device for modulating and reflecting a second of the first light beam and the second light beam reflected from the dichroic polarizing beam splitter, wherein the dichroic polarizing beam splitter reflects a light beam coming from the first reflection-type liquid crystal display device and transmits a light beam coming from the second reflection-type liquid crystal display device so as to integrate the light beam coming from the first reflection-type liquid crystal display device and the light beam coming from the second reflection-type liquid crystal display device.

28. A projection display apparatus as claimed in claim 27, further comprising:

a polarizing beam splitter for transmitting or reflecting the first light beam before it is shone onto the dichroic polarizing beam splitter, wherein the polarizing beam splitter transmits or reflects the light beams integrated by the dichroic polarizing beam splitter.

29. A projection display apparatus as claimed in claim 27, further comprising:

a second dichroic reflecting surface for separating a third light beam of a third wavelength range from the second light beam;

a first polarizing beam splitter for reflecting the third light beam; and a third reflection-type liquid crystal display device for modulating and reflecting the third light beam after reflection by the first polarizing beam splitter, wherein the first polarizing beam splitter transmits a light beam coming from the third reflection-type liquid crystal display device.

30. A projection display apparatus as claimed in claim 27, further comprising first and second polarizing plates for flattening a polarization plane of a corresponding first and second light beam, the first and second polarizing plates being disposed in front of the dichroic polarizing beam splitter.

31. A projection display apparatus as claimed in claim 27, wherein the source light beam is a polarized source light beam.

32. A projection display apparatus as claimed in claim 27, further comprising:

a light source for emitting a source light beam; and a polarization converter for aligning a polarization direction of the source light beam coming from the light source with a predetermined polarization plane, wherein the thus polarized source light beam coming from the polarization converter is shone onto the first dichroic reflecting surface.

33. A projection display apparatus as claimed in claim 28, wherein said source light beam comprises light beams of red, green, and blue wavelength ranges, and wherein the first light beam is the light beam of the blue wavelength range.

34. A projection display apparatus as claimed in claim 29, further comprising:

a second polarizing beam splitter for integrating the light beam transmitted through the first polarizing beam splitter and the light beams integrated by the dichroic polarizing beam splitter.

35. A projection display apparatus as claimed in claim 29, wherein said source light beam comprises light beams of red, green, and blue wavelength ranges, and wherein the third light beam is the light beam of the red wavelength range.

36. A projection display apparatus as claimed in claim 29, wherein said source light beam comprises light beams of red, green, and blue wavelength ranges, and wherein a portion of the second light beam that remains after separation of the third light beam is the light beam of the green wavelength range.

37. A projection display apparatus as claimed in claim 29, further comprising first, second, and third band-pass filters disposed over a front surface of a respective first, second, and third reflection-type liquid crystal display device, the first, second, and third band-pass filters for passing a corresponding wavelength range of a light beam shone onto the respective first, second, and third reflection-type liquid crystal display devices.

38. A projection display apparatus as claimed in claim 34, further comprising a projection optical system for projecting the light beams integrated by the second polarizing beam splitter.

39. A projection display apparatus as claimed in claim 34, further comprising a wavelength plate for rotating a polarization plane of the third light beam before the third light beam enters the second polarizing beam splitter.

* * * * *